Aug. 7, 1951
J. E. BEVINS
2,563,207
AIRSPEED INDICATOR
Original Filed June 7, 1943
2 Sheets-Sheet 2
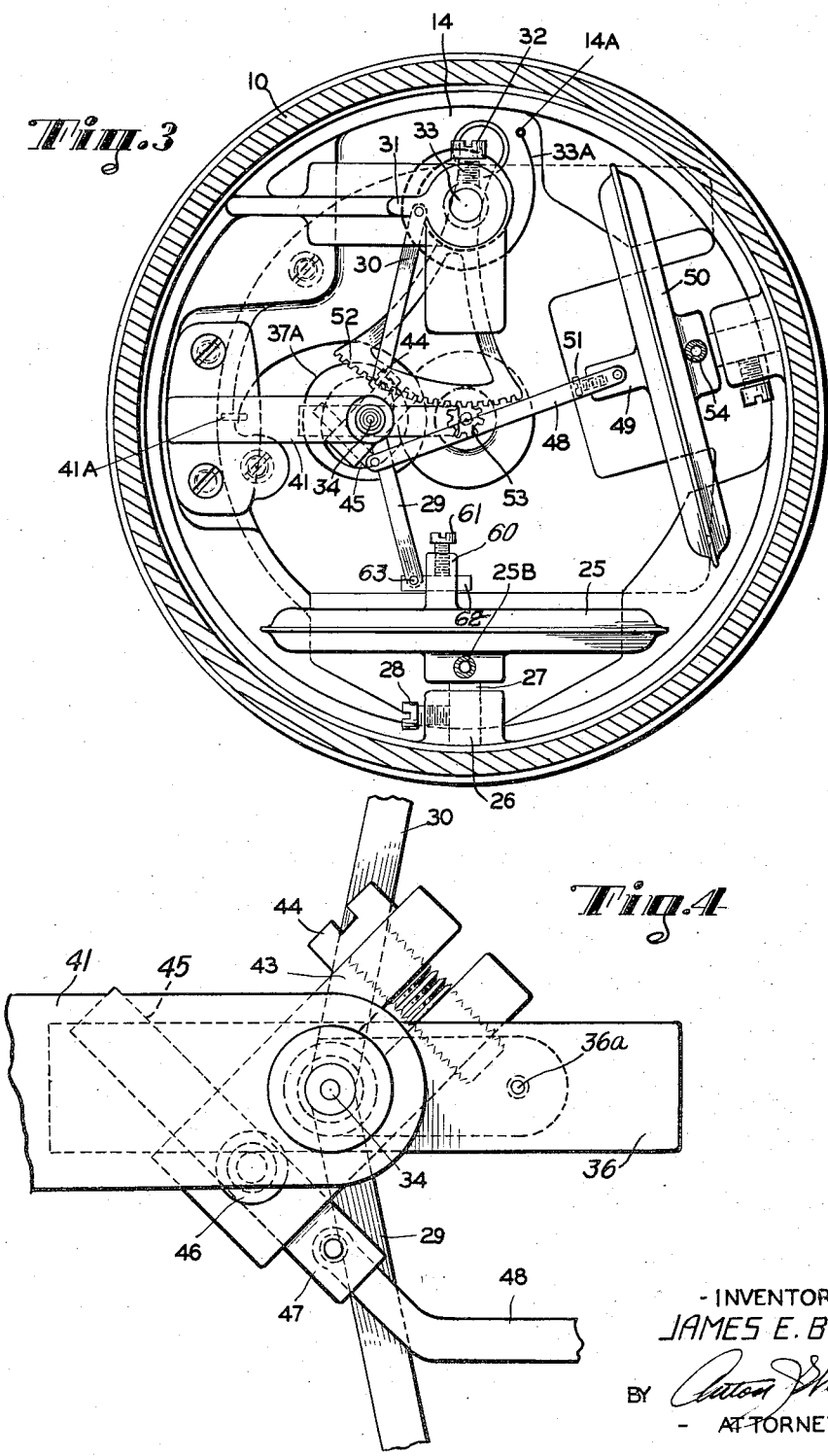
- INVENTOR -
JAMES E. BEVINS
BY
- ATTORNEY -

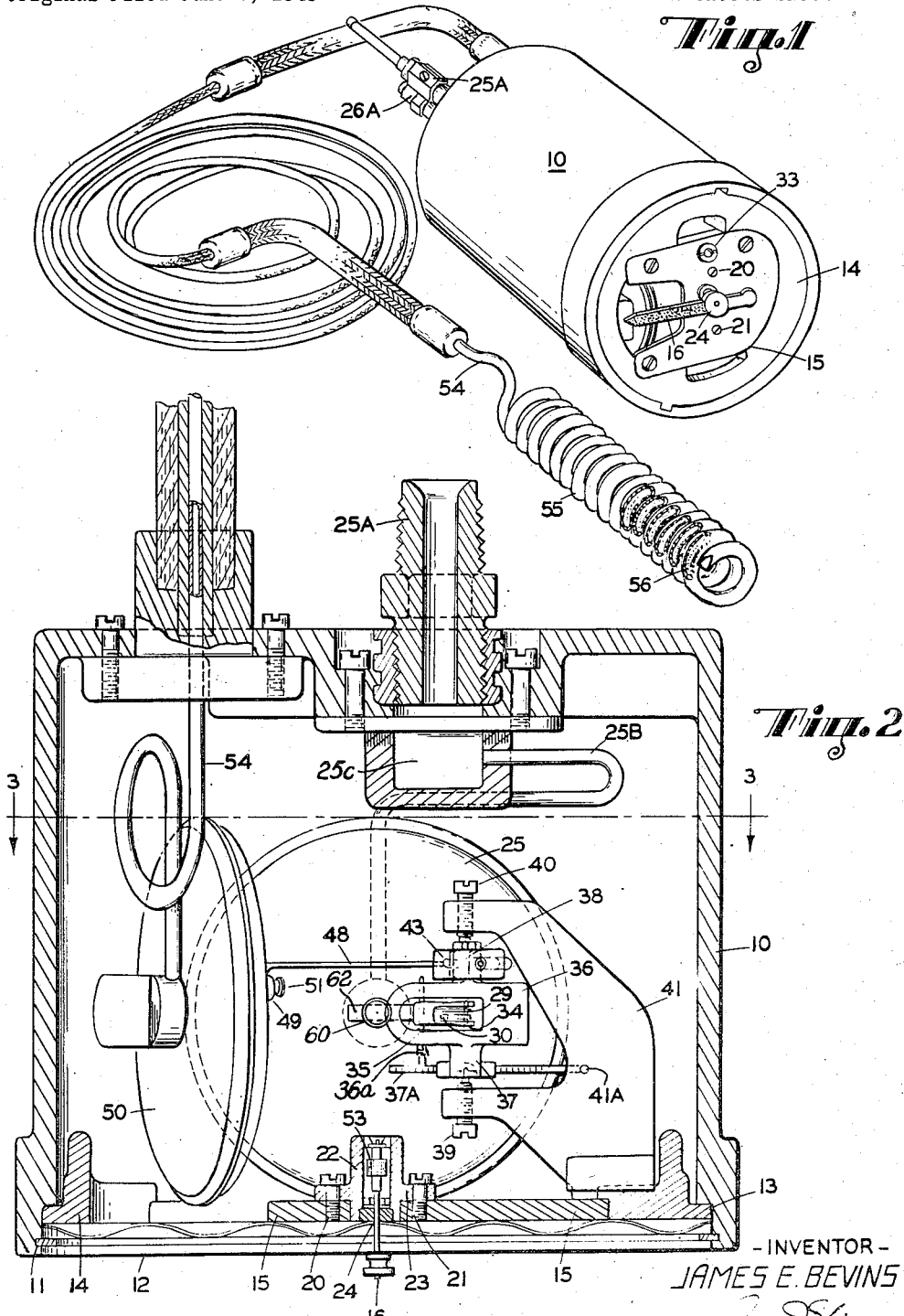

Patented Aug. 7, 1951

2,563,207

UNITED STATES PATENT OFFICE 2,563,207

AIR-SPEED INDICATOR

James E. Bevins, Ramsey, N. J., assignor to Bendix Aviation Corporation, Teterboro, N. J., a corporation of Delaware Original application June 7, 1943, Serial No. 489,983. Divided and this application August 23, 1945, Serial No. 612,196

5 Claims. (Cl. 73—182)

This invention relates to an airspeed indicator, and more particularly to an airspeed indicator in which compensations are made for varying air densities encountered at all flying levels.

This application is a division of my copending application for an air thermometer used in true airspeed indicators, bearing Serial No. 489,983, filed on June 7, 1943, now U. S. Patent No. 2,426,663, issued September 2, 1947.

True airspeed indicators are designed to indicate relative velocity between the air stream and the craft at any altitude and temperature likely to be encountered in normal service. Unless the instrument includes a compensator means responsive to the different air densities present at different altitudes and temperatures, the pilot must correct the indicated airspeed reading in accordance with each variation in altitude and temperature.

To obtain true airspeed at all normally experienced altitudes and temperatures, prior devices use vapor tension or liquid-filled thermometers requiring two or more Bourdon tubes or diaphragms to compensate for the pressures created from sudden air density variations. With the air thermometer used in the present invention, the pressures created by such changes in air density are relatively low, as compared with pressures created in the prior devices, making it satisfactory to use one pressure responsive member to give both temperature and altitude correction (density correction).

An object of the present invention is to provide a true airspeed indicator in which varying air densities are compensated for by the changes in temperature and barometric pressure affecting a pressure responsive element.

Another object of the present invention is to provide a true airspeed indicator of the character described in which the effect of temperature changes on a pressure responsive element is dependent upon the expansion and contraction of a gas due to the diffusion and adsorption of the gas.

A further object of the present invention is to provide a true airspeed indicator of the character described in which the condition of a pressure responsive element affected by changes in temperature and barometric pressure is utilized for varying the output of a second pressure responsive element affected by the static and impact pressures as obtainable from a Pitot tube.

Still another object of the present invention is to provide a durable true airspeed indicator of the character described, which shall be relatively inexpensive to manufacture, positive in its operation, and practical and efficient to a high degree in use.

Other objects of the invention will in part be obvious and in part hereinafter pointed out.

The invention accordingly consists in features of construction, the combinations of elements, and arrangement of parts which will be exemplified in the construction hereinafter described and of which the scope of this application will be indicated by the appended claims.

In the accompanying drawings, in which one of the various possible illustrative embodiments of this invention is shown, and wherein like reference characters refer to like parts throughout the several views;

Figure 1 is a perspective view of a true airspeed indicator embodying the invention.

Figure 2 is a longitudinal cross section view of the casing with the elements inside shown in elevation.

Figure 3 is a sectional view taken along line 3—3 in Figure 2.

Figure 4 is an enlarged elevational view of one form of mechanical compensator linkage.

Referring in detail to the drawings, 10 is a casing open at the front provided with an annular groove 11 to receive a snap ring 12 and with an annular shoulder 13 to support ring or frame 14.

The surface of frame 14 is recessed to receive a centrally perforated plate 15 to which is secured a bushing 22 having a coupling flange 23, coupled flush against the under side of plate 15 by bolts 20 and 21. Extending from within the casing 10, through bushing 22, is an indicator hand spindle 24.

Spindle 24 has the usual indicator hand 16 on the outer extremity and is in operative mechanical connection at the other end, inside casing 10, to diaphragm 25 suspended from apertured lug 26 on shaft 27. Shaft 27 is held in lug 26 by set screw 28, see Figure 3.

Diaphragm 25 is actuated by differential in static and dynamic pressure received through static pressure connection 26a and dynamic pressure connection 25a coupled to capillary tube 25b through a small chamber 25c on the interior of casing 10, see Figures 2 and 3.

Fixed to diaphragm 25 in a suitable manner is an upstanding lug 60. Received in an aperture (not shown) in said lug is a bar 62 held fast therein by a screw 61. Pivoted at one end of the bar 62, as at 63, is a link 29 of a toggle link connection comprising link 29 and link 30. Link 30 is secured to a yoke 31, adjustably secured by a set screw 32 to an oscillator bar 33, suitably journalled in plate 15. Also secured to bar 33 is the inner end of back-lash take-up hair spring 33a, with the outer end secured to pin 14a on frame 14. At the opposite end, link 30, together with the free end of link 29, are pivoted on a pin 34 provided at the outer ends of yoke 35. The yoke 35 is in turn pivoted at its opposite end on a pin 36a in a rocker bracket 36. The rocker bracket 36 is provided with two aligned lugs 37 and 38 which form a pivoted support for said rocker bracket between the screw pins 39 and 40 threaded in a frame 41 fixed in the casing 10. Pins 39 and 40, and pin 34 of yoke 35 are in alignment when the instrument is not in use.

Rocker bracket lug 37 has associated therewith a hair spring 37a secured at the outer end to pin 41a and lug 38 has clamped thereto an elongated split lug 43 clamped thereto by screw 44. Split lug 43 is apertured at the opposite end (see Figure 4) to receive elongated bar 45. Bar 45 is adjustably secured in the split lug aperture by set screw 46, so that an end protrudes therefrom at 47 to which is pivoted link 48.

Link 48 is adjustably secured to inwardly extending lug 49 of diaphragm 50 by set screw 51 and any back-lash in link 48 is taken out by hair spring 37a, see Figure 3.

Secured to oscillator bar 33 is a segment gear 52 so positioned as to mesh with a pinion 53 of indicator spindle 24, that carries indicator hand 16.

The above described linkage is generally referred to herein as any suitable differential linkage.

As shown in Figures 1 and 2, compensator diaphragm 50 is connected to a capillary tube 54, connected in turn to a bulb or coil 55, which is subject to the temperature that is to be measured. The coil or bulb 55 is completely filled with gas adsorption medium, such as activated cocoanut charcoal granules 56, before it is soldered to the capillary tubing 54. The system is then completely evacuated with the bulb 55 at approximately 150° C. It is then charged with any suitable dry gas, as carbon dioxide ($CO_2$).

During the filling operation, bulb 55 is gradually cooled to the lowest temperature that it is expected to encounter in service, while the filling gas is still connected to the system. The bulb 55 is next sealed and the gas is in contact with the diaphragm 50 and the activated cocoanut charcoal in bulb 55 for the purpose referred to under the following heading.

*Operation*

Assuming the entire device to be installed in an aircraft, the proximate cause of compensation for varying air densities is the reaction of charcoal contained in bulb 55 with the $CO_2$ gas. As the charcoal is cooled, it adsorbs the gas and causes a partial vacuum in the system. When it is heated, the opposite effect is present and causes a pressure to expand the diaphragm 50. This expansion and contraction of the sensitive element 50 is transmitted through the differential linkage to give correct compensation of a true airspeed indicator.

As hereinbefore indicated, the pins 39 and 40, and pin 34 are in alignment when the instrument is not in use. The expansions and contractions of the diaphragm 25 due to the varying pilot pressures will be transmitted by link 29 to the link 30 by reason of its connection therewith by the pin 34. The motion of the link 29 in moving the link 30, will cause the yoke 35 to rotate about its pivot pin 36a in the rocker bracket 36. The motion thus transmitted will rotate the segment gear 52 to rotate spindle 24. Pointer 16 will move over an airspeed dial (not shown) to indicate airspeed.

Expansion and contraction of the diaphragm 50 due to changes in temperature will move the link 48 causing the rocker bracket 36 to rotate about its pivot on pins 39, 40. The rotation of the bracket 36 will cause the pin 36a therein to move in an arc about the axis determined by the screw pins 39, 40. With the diaphragm 25 unaffected by Pitot pressures, no motion due to the expansion or contraction of diaphragm 50 will be transmitted by link 30 to the spindle 24. The point of pivot of link 30 (and 29) is not varied. Thus the arrangement described will not affect the "zero position" or pointer 16.

The arcuate displacement of pin 36a will vary the effective lengths of links 29 and 30 due to the change in the relative position of their point of pivot. The rotation of segment gear 52 by the links 29, 30 is thus compensated for air temperature and density. The pointer 16 will thus be rotated to indicate "true airspeed" in contradistinction to "indicated airspeed" heretofore had.

If we assume the aircraft to be travelling at a constant velocity with the pivot point 34 at a position slightly above the position shown in Figs. 3 and 4 and an increase in altitude takes place with an accompanying decrease in temperature, the diaphragm 50 will tend to contract due to the absorption of $CO_2$ gas. Under these conditions, however, the pressure of the air surrounding the diaphragm 50 will decrease and tend to expand the diaphragm. The net result will be the expansion of the diaphragm 50 inasmuch as the effect on the diaphragm of the air pressure is greater than the effect of the instant temperature in varying the pressure of $CO_2$ in the diaphragm. This result is readily apparent when it is considered that the amount of effective change in pressure with a change in altitude is greater than the amount of effective change in temperature with the same change in altitude. Diaphragm 50 is so calibrated that with changes in altitude the effective force which predominates is that due to air pressure, but temperature compensation is added thereto in order to provide for a true airspeed indication.

The expansion of the diaphragm upon an increase in altitude will shift the link 48 to the left (Figs. 3 and 4) to rotate the rocker bracket 36 clockwise about its pivots 39, 40 (34). The pivot 36a of links 29 and 30 in yoke 35 will be rotated clockwise or moved downwardly and slightly to the left. The pivot point 34 of links 29, 30 will thus be rotated clockwise to increase the obtuse angle formed by the links. The movement of pivot 34 will push link 30 upwardly to rotate segment gear 52 in a clockwise direction in Fig. 3 to increase the indication to approach true airspeed of the craft. This will give the true airspeed of the craft because the air of decreased density which actuates diaphragm 25 and links 29, 30 tends to decrease the indication below its true value. With the aid of the compensator diaphragm 50 the driven link 30 will be urged in the direction mentioned to offset the decreased pressure on the air speed diaphragm 25 due to the increase in altitude.

A decrease in altitude and an increase in air temperature with a consequent increase in pressure and density at both diaphragms 25 and 50 will contract the last-mentioned diaphragm and shift link 48 to the right to decrease the obtuse angle formed by links 29, 30 to decrease the reading of the indicator. In this manner, increased pressure in the diaphragm 25 will be overcome by the movement of link 48 to the right to urge link 30 and gear 52 in a counterclockwise direction to decrease the reading of the indicator. Thus, for increases and decreases in temperature and pressure with the resultant changes in density, the indicator will effect a reading of the true airspeed of the aircraft.

The characteristics of the system can be controlled by making a larger or smaller bulb and putting in varying amounts of activated cocoanut charcoal.

Any other type activated carbon can be used to fill such a system, but cocoanut charcoal is satisfactory as it is most active for gas adsorption.

It will thus be seen that there is provided a true airspeed indicator in which the several objects of this invention are achieved, and which is well adapted to meet the conditions of practical use.

As various possible embodiments might be made of the above invention and as various changes might be made in the embodiment set forth, it is to be understood that all matters herein set forth, or shown in the accompanying drawings are to be interpreted as illustrative and not in a limiting sense.

What I claim is:

1. An airspeed indicator, comprising a pressure actuated member adapted to be actuated by the static and dynamic air pressures as delivered by a Pitot tube, an indicator for said member, means for driving said indicator by the expansion and contraction of said member to indicate airspeed; a temperature responsive element, a second pressure actuated member subject to static air pressure, means for interconnecting the interiors of said element and of said second member, a gaseous medium in the interconnected interiors and a gas-occluding medium in said element adapted to adsorb and expel said gaseous medium due to temperature changes for expanding and contracting said second pressure member; and means operative by the expansion and contraction of said second member to vary said indicator drive means in accordance with the changing temperature and static air pressure to indicate true airspeed.

2. A true airspeed indicator comprising a differential pressure responsive member actuated by static and impact pressures, an indicator for said pressure responsive member, variable means for driving said indicator by the expansion and contraction of said member for indicating airspeed, a temperature responsive element containing a gas occluding medium and a gaseous medium, and a container having a movable wall operated by the gas pressure, said container being also subjected to static pressure and said wall being connected to said driving means, said gas operated container communicating with said temperature responsive element and adapted to be actuated by the static pressure and the pressure changes in the gaseous medium due to the varying absolute temperature surrounding said element to vary said driving means of said indicator in accordance with varying air densities to effect an indication of true airspeed.

3. A true airspeed indicator comprising a casing, means comprising a yieldable wall movably mounted within said casing and exposed on one side thereof to static pressure communicated from the exterior of the casing and on the opposite side thereof to dynamic pressure communicated from the exterior of the casing, means comprising a pointer connected for operation by said wall, temperature and pressure compensating means connected to modify operation of the pointer by the wall, said last-named means comprising a closed expansible and contractible container mounted in said casing and exposed to static pressure on the outside thereof, said container being provided with a gas therein, and means outside of said casing responsive to temperature changes and connected with the inside of said container for changing the gas pressure therein.

4. A true airspeed indicator comprising a casing, means comprising a yieldable wall movably mounted within said casing and exposed on one side thereof to static pressure communicated from the exterior of the casing and on the opposite side thereof to dynamic pressure communicated from the exterior of the casing, means comprising a pointer connected for operation by said wall, temperature and pressure compensating means connected to modify operation of the pointer by the wall, said last-named means comprising a closed expansible and contractible container mounted in said casing and exposed to static pressure on the outside thereof, and means responsive to temperature changes including a temperature responsive element located outside of said casing and having a gas occluding medium and a gaseous medium therein communicating with the container, whereby changes in static pressures and in ambient temperatures exterior of said temperature responsive element vary the gas pressure in said container to modify the operation of the pointer.

5. A true airspeed indicator comprising a casing, means comprising a yieldable wall movably mounted within said casing and exposed on one side thereof to static pressure communicated from the exterior of the casing and on the opposite side thereof to dynamic pressure communicated from the exterior of the casing, means comprising a pointer connected for operation by said wall, a helically formed temperature responsive element located externally of the casing and containing a gaseous medium and a gas occluding medium therein, an expansible and contractible container mounted within the casing subject to static pressure and communicating with said temperature responsive element, said container being expanded and contracted by said mediums upon changes in temperature of the air about said element, and means drivably interconnecting the pointer and said container for varying the movement of the pointer.

JAMES E. BEVINS.

REFERENCES CITED

The following references are of record in the file of this patent:

UNITED STATES PATENTS

| Number | Name | Date |
|---|---|---|
| 1,159,893 | Browne et al. | Nov. 9, 1915 |
| 1,272,554 | Steenbierg | July 16, 1918 |
| 1,489,463 | Sherrin | Apr. 8, 1924 |
| 1,722,619 | Ziegler | July 30, 1929 |
| 1,839,077 | Adams | Dec. 29, 1931 |
| 2,050,965 | DeGiers | Aug. 11, 1936 |
| 2,221,633 | Dasher | Nov. 12, 1940 |
| 2,251,498 | Schwein | Aug. 5, 1941 |
| 2,302,713 | Paulin | Nov. 24, 1942 |
| 2,318,153 | Gilson | May 4, 1943 |
| 2,379,874 | Bean | July 10, 1945 |

FOREIGN PATENTS

| Number | Country | Date |
|---|---|---|
| 374,730 | Germany | Apr. 27, 1923 |